US008663534B2

(12) United States Patent
Capjon

(10) Patent No.: US 8,663,534 B2
(45) Date of Patent: Mar. 4, 2014

(54) SPIN MOULDING

(75) Inventor: Jan Capjon, Fagerstrand (NO)

(73) Assignee: Hogskolen i Vestfold, Tonsberg (NO)

( * ) Notice: Subject to any disclaimer, the term of this patent is extended or adjusted under 35 U.S.C. 154(b) by 91 days.

(21) Appl. No.: 13/389,834

(22) PCT Filed: Sep. 8, 2010

(86) PCT No.: PCT/NO2010/000331

§ 371 (c)(1),
(2), (4) Date: Feb. 10, 2012

(87) PCT Pub. No.: WO2011/031163

PCT Pub. Date: Mar. 17, 2011

(65) Prior Publication Data

US 2012/0139159 A1    Jun. 7, 2012

(30) Foreign Application Priority Data

Sep. 8, 2009 (NO) .................................... 20092970

(51) Int. Cl.
*B28B 1/20* (2006.01)
(52) U.S. Cl.
USPC ........... 264/310; 264/267; 264/270; 264/309; 264/311; 264/312; 425/435; 118/52; 118/55; 427/231; 427/233; 427/425
(58) Field of Classification Search
USPC ................. 264/267, 270, 309, 310, 311, 312; 425/435; 427/231, 233, 425; 118/52, 118/55
See application file for complete search history.

(56) References Cited

U.S. PATENT DOCUMENTS

| | | | |
|---|---|---|---|
| 1,510,117 A * | 9/1924 | Von Vass | 264/309 |
| 3,010,153 A * | 11/1961 | Bittner | 264/311 |
| 4,363,687 A | 12/1982 | Anderson | |
| 4,372,733 A | 2/1983 | Tinning | |
| 2006/0113714 A1 * | 6/2006 | Giloh et al. | 264/309 |

FOREIGN PATENT DOCUMENTS

| | | |
|---|---|---|
| BE | 1010457 A4 | 9/1998 |
| CH | 665612 A5 | 5/1988 |
| EP | 0357151 A2 | 3/1990 |
| GB | 145413 A | 4/1921 |
| GB | 2264719 A | 9/1993 |
| SU | 532466 A   * | 3/1977 |
| WO | WO-89/00102 A1 | 1/1989 |
| WO | WO-2006/092666 A2 | 9/2006 |

OTHER PUBLICATIONS

Derwent abstract for SU 532466 (1977).*
Bryn, Christen, "International Search Report" for PCT/NO2010/000331, as mailed Dec. 1, 2010, 4 pages.

* cited by examiner

*Primary Examiner* — Timothy Kennedy
(74) *Attorney, Agent, or Firm* — Winstead PC

(57) ABSTRACT

Method of manufacturing a large-scale shell construction, wherein a form is sprayed with a setting construction material, such as concrete. The method comprises rotating the form about a rotation axis while applying said construction material. Preferably it also comprises suspending the form from above in a point through which the rotation axis runs. Furthermore, the method can comprise floating the form on a body of water.

13 Claims, 6 Drawing Sheets

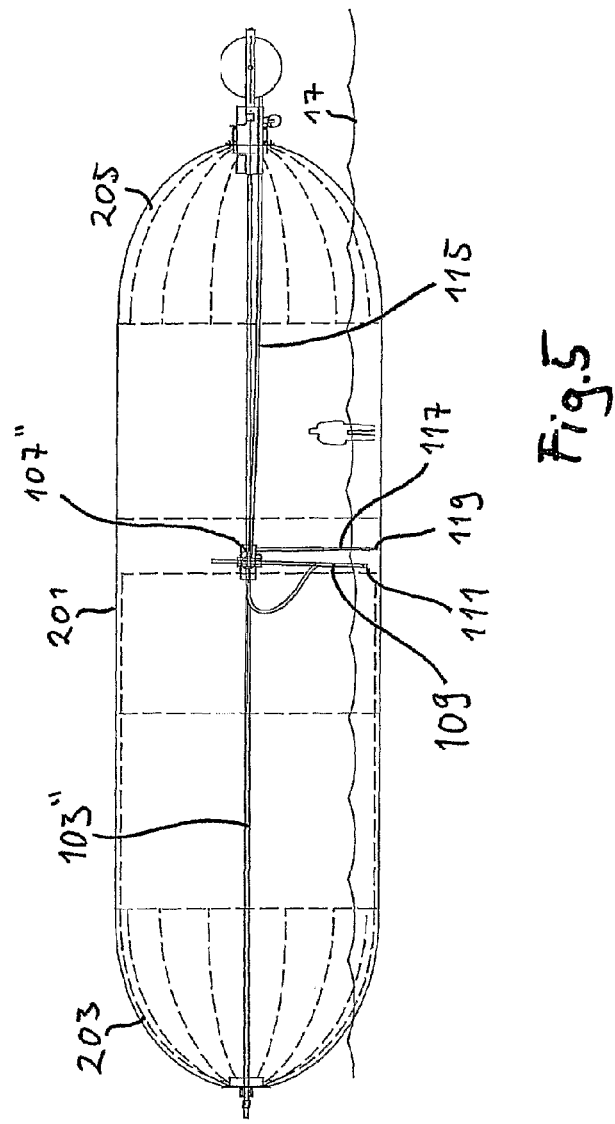
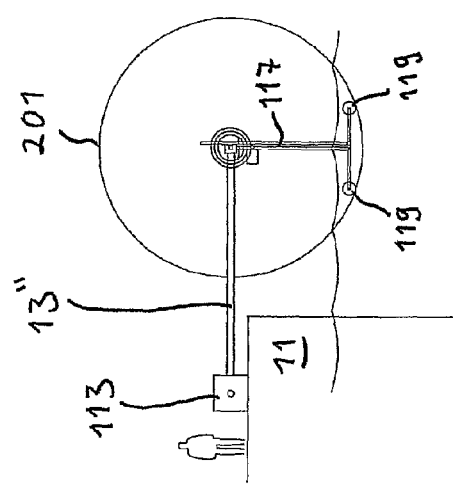
Fig. 5
Fig. 4

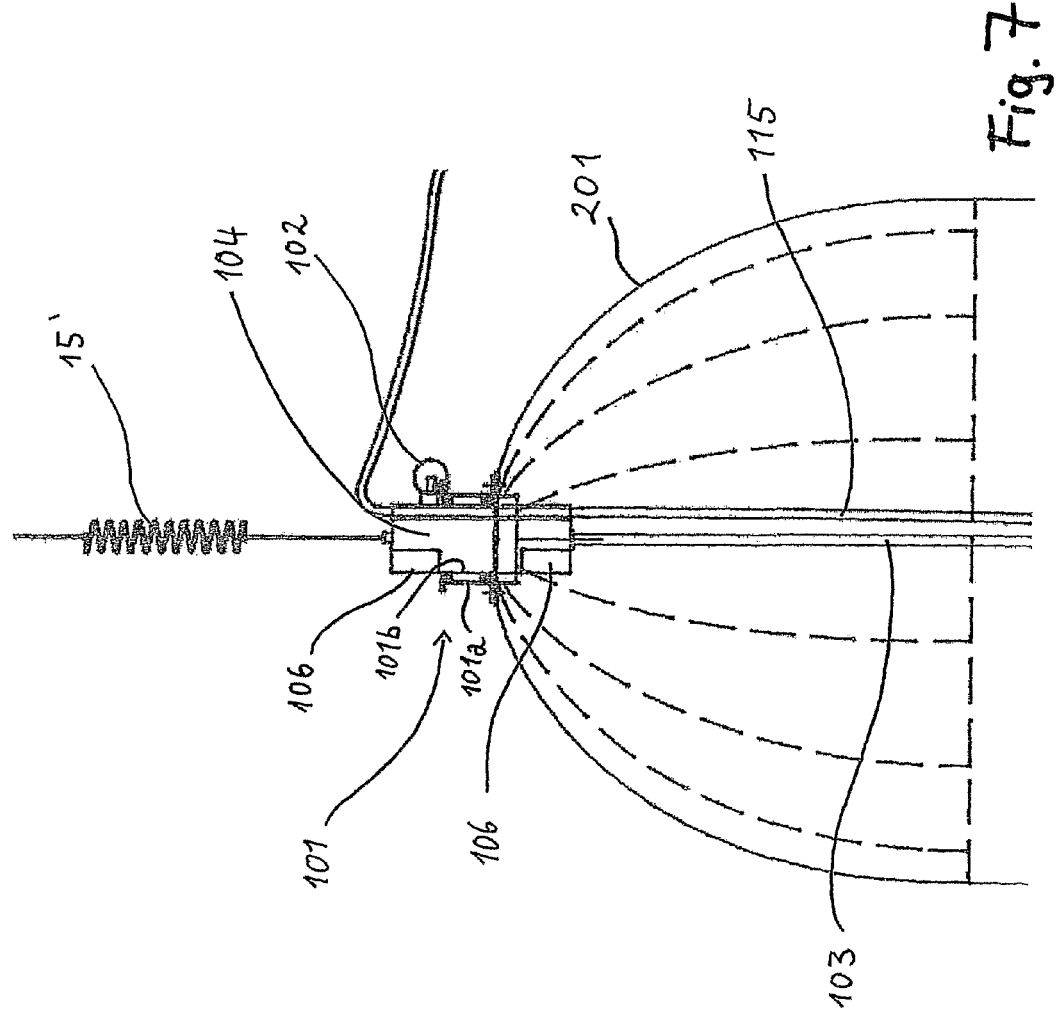

SPIN MOULDING

The present invention relates to production of large scale shell constructions of various shapes. In particular, the invention relates to the manufacture of such constructions by applying a setting material, such as concrete, onto a sheet form.

BACKGROUND

Spraying of concrete onto predefined erected sheet forms, such as inflatable hollow structures, is known. The forms can be made of thin, flexible sheets or foils, such as welded fabric (e.g. nylon or polyester), which, when inflated, take a predefined shape, such as a dome, a cylinder or combinations of these, for instance. In some solutions the sheet form is removed after the concrete has set. In other solutions the form will constitute a significant part of the end product. For many solutions, it is common to fix the form to a flat base in a sealed manner, in such a way that the form encompasses a sealed-off volume together with the base.

EP 0357151 describes a method of spraying synthetic foam and concrete onto the inside of an inflated form.

International patent application publication WO89/00102 describes the manufacturing of building structures by spraying a building material formulation onto a form. The form can be removed after setting of the building material.

US patent publication U.S. Pat. No. 4,372,733 describes an apparatus for applying concrete onto an erected mould. The apparatus is adapted to rotate about the mould and apply concrete in strips around the mould. Furthermore, the concrete applying apparatus is adapted to the specific shape of the mould, in order to follow the mould surface. A rather complex and costly amount of equipment is used to apply concrete on the outer surface of the form. If the mould or the final product is large, the concrete applying apparatus must be correspondingly large.

Swiss patent publication CH 665 612 describes a concrete tank. If such a tank were to be made large, for instance for storage of large amounts of liquid natural gas or other hydrocarbons offshore, it would be un-practical to make it on land and then move it to the sea. Such large-scale tanks should perhaps be made at the coast, avoiding road transportation.

THE INVENTION

According to the present invention, there is provided a method of manufacturing a large-scale shell construction, wherein a form is sprayed with a setting construction material. The setting construction material can be of any suitable type, such as a polymer or a concrete. Particularly suitable are composite materials, preferably with fibres, which can be used without further reinforcement. The method comprises rotating the form about a rotation axis while applying said construction material.

The said rotation axis is preferably vertical, but can also be horizontally oriented.

With the method according to the invention, one can spray the outer surface of a form without moving a spraying arrangement about the rotation axis. Instead, the spraying arrangement can be positioned at a substantially constant position with respect to the rotation axis, and be adapted for moving a spraying nozzle in a plane parallel to the said rotation axis.

In a preferred embodiment, the method according to the invention comprises suspending the form from above. The form can be suspended in a point through which the rotation axis runs, such as in a swivel.

In an alternative embodiment, or in combination with the above, the method can comprise floating the form on a body of water. Thus, according to various embodiments of the invention, one can suspend the form from above or float it on a body of water, or combine these two set-ups.

With such embodiments, the form can have a lower shape which is not suited for resting on the plane floor of a production hall, for instance. The lower part of the form can thus have a substantially arbitrary shape.

Preferably, the form substantially completely encloses an inner volume. I.e. the form is of such shape that it encloses a volume without contribution of additional surfaces not being part of the form. Moreover, the form is preferably inflatable. It should, however, be understood that the form may have apertures for the entrance of equipment and/or the setting construction material. This will become apparent in the detailed descriptions of example embodiments.

The method according to the invention can comprise spraying an inner surface of the form by supplying construction material from the outside of the form, through a construction material supply line extending into the form, and by means of an inner construction material spraying arrangement situated inside the form.

The method can further comprise coating an outer surface of said form using an outer construction material spraying arrangement. This arrangement can be maintained in a substantially constant position with respect to the position of the form, as explained above.

In a further particularly preferred embodiment, the method according to the invention comprises suspending the form in a crane or other suspension arrangement which is arranged onshore, such as on a dock or a quay, above, and possibly extending into, a body of water.

With the term onshore is here meant that the crane or the suspension arrangement is supported on the ground. However, the crane or suspension arrangement can also be arranged on the seabed or on a floating structure, such as a ship. It should also be noted that the body of water can be sea water or any other body water, such as a lake or an artificial lake, a pool or the like.

The method according to the present invention can further be characterized in suspending the form in a manner enabling a substantially vertical rotation axis, and arranging a weight to the lower side of the form to provide stability.

In a further embodiment, the method according to the invention comprises floating the form on water and rotating the form about a horizontal rotation axis, wherein an inner spraying arrangement is used for spraying the inner surface of said form.

A preferred setting construction material has characteristics before setting which in many ways resembles those of a foam. It can be transported through a pipe, sprayed onto a surface, and will make a significant layer without flowing due to gravity. For instance, preferably a layer of a thickness of more than 10 cm, preferably even more than 20 cm can be made to stick onto a surface with an arbitrary orientation, even on the downwardly facing side of a horizontal surface or a vertical surface.

The form is preferably a flexible sheet form which can be transported in a packed state and which can be erected, for instance through inflation, before applying the setting construction material. Preferably, the form is made of a sheet material that is flexible for bending, but which is substantially non-elastic to tensile forces, such as the characteristics of a tarpaulin.

Herein, the term "spray" is meant to include any kind of application method wherein the construction material is fed out of the end of a supply channel, such as the end of a tube or a nozzle, and wherein the construction material does not flow or run out of the supply arrangement only by means of gravity. Preferably, the material is ejected by means of pressure and thrown through the air against the form. However, this can also take place by forcing the material directly against the surface of the form or the surface of previously applied material.

EXAMPLES

Having described the main features of the present invention, some detailed examples of various embodiments will now be given with reference to the drawings, in which FIG. 1 is a side view of a first embodiment according to the invention, wherein a form is suspended from a harbour crane and partially floated in water;

FIG. 4 is a side view of another embodiment according to the present invention;

FIG. 5 is another view of the form used in the embodiment shown in FIG. 4;

FIG. 7 is a detailed cross section view of a lock chamber arranged at the upper part of a suspended form.

Figure 1:
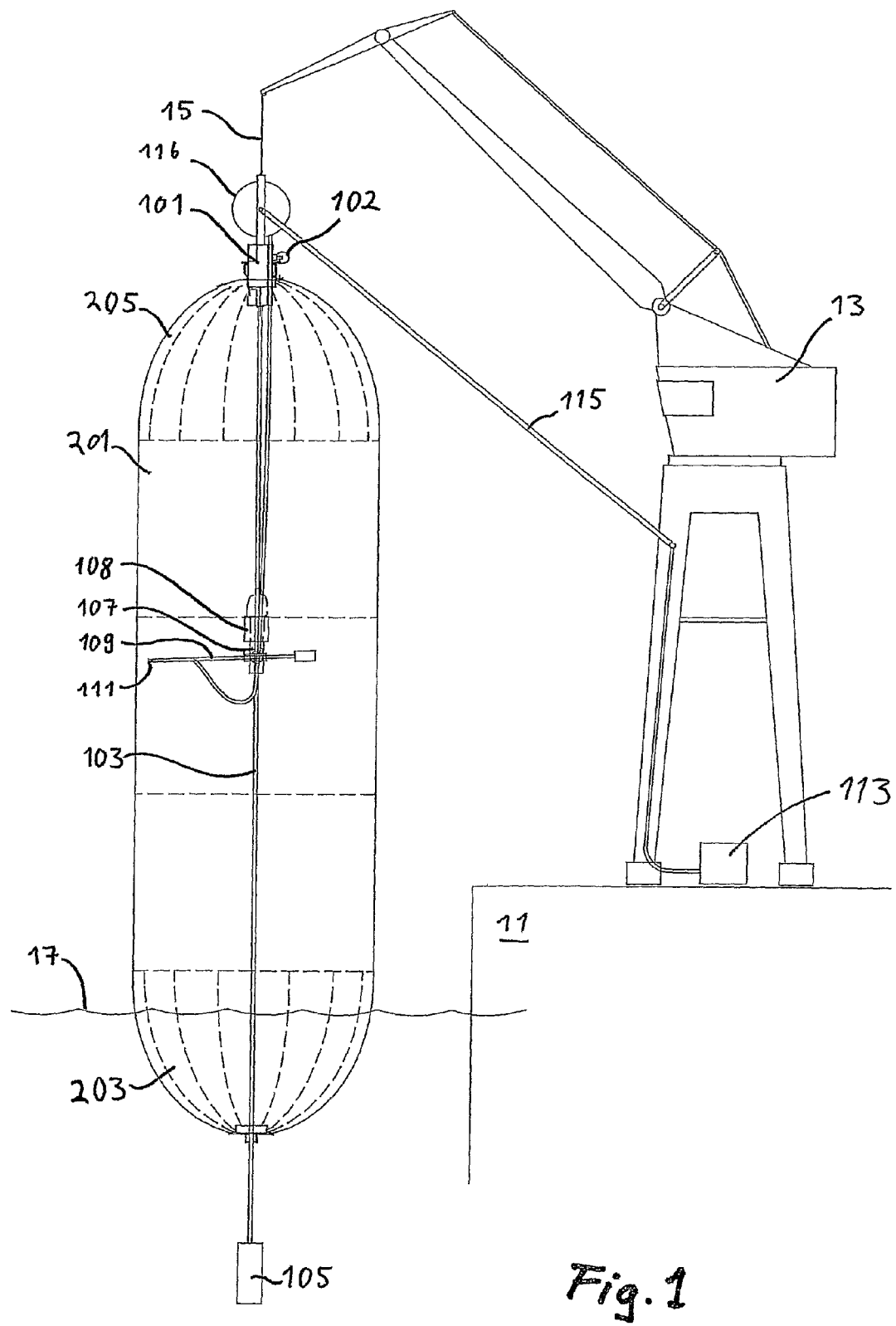

FIG. 1 shows one possible embodiment according to the invention. On a quay 11 there is arranged a harbour crane 13 suitable for lifting and moving goods attached to the end of its crane cable 15. In the shown position, the crane 13 is swung over the water surface 17 outside the quay 11. At the end of the crane cable 15 there is attached a form handling arrangement 101, onto which there is attached an inflated form 201. In this embodiment, the inflated form 201 is symmetrical about its central vertical axis. Downwards from the form handling arrangement 101, there is a tube 103. The tube 103 extends downwards through a lower part of the form 201. To the end of the lower end of the tube 103 there is preferably attached a weight 105 providing stability to the set-up.

The form handling arrangement 101 comprises a controllable gear motor 102 arranged to rotate the form 201 in a controlled manner about a rotation axis at the centre of the tube 103. Preferably, the said control can be computerized, wherein one at all times has control of rotational speed and the angular position of the form 201 about the rotation axis.

Preferably, the gear motor 102 is operatively maintained in a steady, non-rotating position with a bar or the like extending from the quay 11. This is to prevent the motor 102 to rotate due to forces exerted on it from the form 201 when the latter is rotated.

On the quay 11 is also arranged a pump (not shown) for inflation of the form 201. An air hose (not shown) provides air from the pump to the inner volume of the form 201 and the pump is arranged to keep a constant pressure inside the form 201.

In this embodiment, as illustrated in FIG. 1, the lower part of the form 201, the lower part of the tube 103 and the weight 105 extend into the water, below the water surface 17. It should be noted that in an alternative embodiment, the form 201, the tube 103, and the weight could also hang freely in the air, above the water or above land. It would also be possible to fix the lower end of the tube 103 to the ground or anchor it to the bottom of the water. However, floating a part of the form 201 in the water relieves the load on the crane 13.

Figure 3:
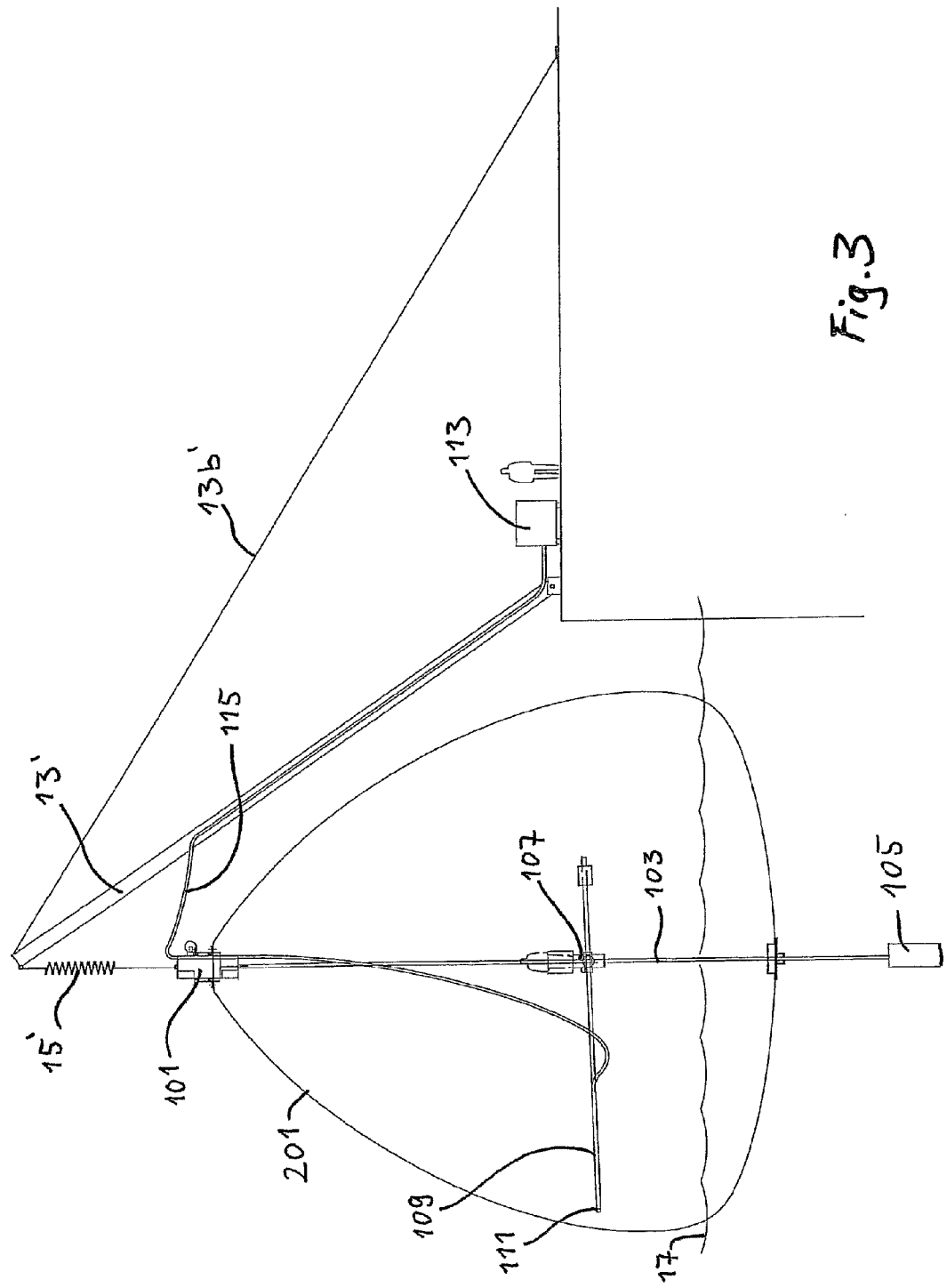
FIG. 3 is a side view showing further alternatives to the embodiments shown in FIG. 1 and FIG. 2.

Furthermore, it is also possible to suspend the form 201 and the form handling arrangement 101 from another suitable device instead of the crane 13, such as a fixed construction, or in a compression rod(s)/wire arrangement as shown in FIG. 3.

Reverting to FIG. 1, to the tube 103 there is arranged an inner spraying arrangement 107 for carrying and steering spraying of construction material onto the inner surface of the form 201. The inner spraying arrangement 107 can preferably be a three-axes robot unit. Furthermore, it is adapted to move in the vertical direction along the tube 103. Such movement can be achieved in various ways known to a person skilled in the art, such as by providing the tube 103 with a toothed rod engaging with a toothed wheel in the inner spraying arrangement 107, or another wheel engaging a groove in the tube 103.

Directly above the inner spraying arrangement 107, there is preferably arranged a man-carrying basket 108. From this position, an operator can monitor the spraying process or control the inner spraying arrangement 107 manually.

The form handling arrangement 101 includes a lock chamber with upper and lower lids that can be opened, one at a time, and allow a person to pass through without loosing too much inner air pressure (see FIG. 7). The arrangement additionally is equipped with external bearings which allows rotation of 201 with 101 being static.

Preferably, the form handling arrangement 101 comprises an outer and an inner cylinder 101a, 101b (FIG. 7), between which there is arranged a bearing for mutual rotation between the two cylinders. The form 201 is then preferably attached to a flange connected to the outer cylinder 101a.

During spraying of the inner surface of the form 201 with the inner spraying arrangement 107, one can choose to keep the form 201 still and move the spraying arrangement 107 in a rotational direction about the tube 103. One can also maintain the inner spraying arrangement in a non-rotating position, wherein it only moves parallel with the tube 103.

The inner spraying arrangement 107 further comprises an arm 109 extending out from the direction of the tube 103 and adapted to being moved in the direction in which the arm extends. At the outer end of the arm 109 there is arranged a nozzle 111, out of which the construction material, such as concrete, is sprayed onto the inner surface of the form 201. The arm 109 is also adapted to be rotated about an axis normal to the tube 103. Hence, the arm 109 and nozzle 111 can take substantially any desired direction inside the form 201. The extension of the arm 109 can e.g. be achieved through a toothed rod/wheel arrangement, and the rotation through a spur gear arrangement or by means of an actuator/cylinder.

It is also possible to arrange more than one spraying arrangement inside the form 201. For instance in a situation where a very large form is to be sprayed from the inside, a plurality, for instance two, of spraying arrangements can be involved.

At the base of the crane 13 there is arranged a mixer/pump unit 113 from which the construction material is supplied. From the mixer/pump unit 113 a supply line 115 is guided upwards along the crane 13 and to the form handling arrangement 101 at the upper part of the form 201. The supply line 115 is further extended, through the form handling arrangement 101, into the form 201 along the tube 103, and to the arm 109/nozzle 111. In this manner, construction material is led from the mixer/pump unit 113, through the supply line 115, past the inner spraying arrangement 107 and finally onto the inner surface of the form 201 by spraying. A reel 116 can be adapted to the form handling arrangement 101 to pay the supply line 115 in and out, along with the movement of the inner spraying arrangement 107 along the tube 103.

Preferably the supply line 115 is led into the form through a sealed lead-in arrangement, making it possible to move the supply line 115 in and out from the form 201 without pressure loss.

When manufacturing a shell construction with the shape shown by the form 201 shown in FIG. 1, by spraying the inner surface of the form, a first lower end part 203 of the form 201 is preferably first sprayed with the setting construction material. After setting, the first lower part 203 is sufficiently stiff to withstand hydrostatic pressure from the water when the form 201 is lowered partly into it to disburden the crane—and upward spraying can continue. When inflated, the inner pressure of the form 201 is sufficient to maintain the correct shape of the parts of the form 201 which extend above the water surface 17.

Possible uses of a shell construction as the one illustrated in the embodiment with reference to the figures may include various types of tanks, such as tanks for hydrocarbons, gas or live fish. It can also be used as different kinds of buoyancy elements or a part of a larger assembled construction. Its size is limited by the possibilities of the crane 13, as its distance above the water surface 17 affects the possible length or height of the form 201. It should be noted, however, that the longest possible length of the form 201 is longer than the maximum distance between the water surface 17 and the maximum elevation point of the crane 13. This is because a part of the form 201 can extend into the body of water. In a special embodiment, it would also be possible to lead water into the form to facilitate an arrangement of the form 201 deeper into the water without having to force it downwards against the buoyancy forces.

An outer spraying arrangement 301 (not shown in FIG. 1) is preferably arranged on the quay 11. (See FIG. 6 for illustration of a possible outer spraying arrangement 301.) Preferably, when spraying the outer surface of the form 201, an upper second end part 205 is sprayed first. After setting, the entire form 201 is turned upside down, so that the second end part is arranged as a lower end part. The second end part 205 can then be partially extended into the body of water without the form 201 being deformed by the hydrostatic forces from the water.

In another embodiment, with suitable setting construction material, the lower first end part 203 could also be sprayed from the outside with use of the outer spraying arrangement 301. In such an embodiment, the form 201 must be sufficiently elevated to make it possible to spray the end part 203. Furthermore, the setting construction material must be of such characteristics that it will fasten to and set on the outer, downwardly facing surface of this end part 203. This would elude the need for turning the form 201 around.

Of course, after a first end part 203, 205 is sprayed, the rest of the form is also sprayed in order to provide a complete stiff construction. In some embodiments, one could also start the spraying process on other surfaces of the form 201, provided the shape of it is not changed due to the weight of the material.

With an embodiment as shown in FIG. 1, as the weight of the construction being made increases when material is sprayed onto the form, the above suspension is preferably yielding in order to let the form 201 sink further into the body of water. In this way the tension in the suspension means, such as the crane cable 15, is kept low.

Figure 2:
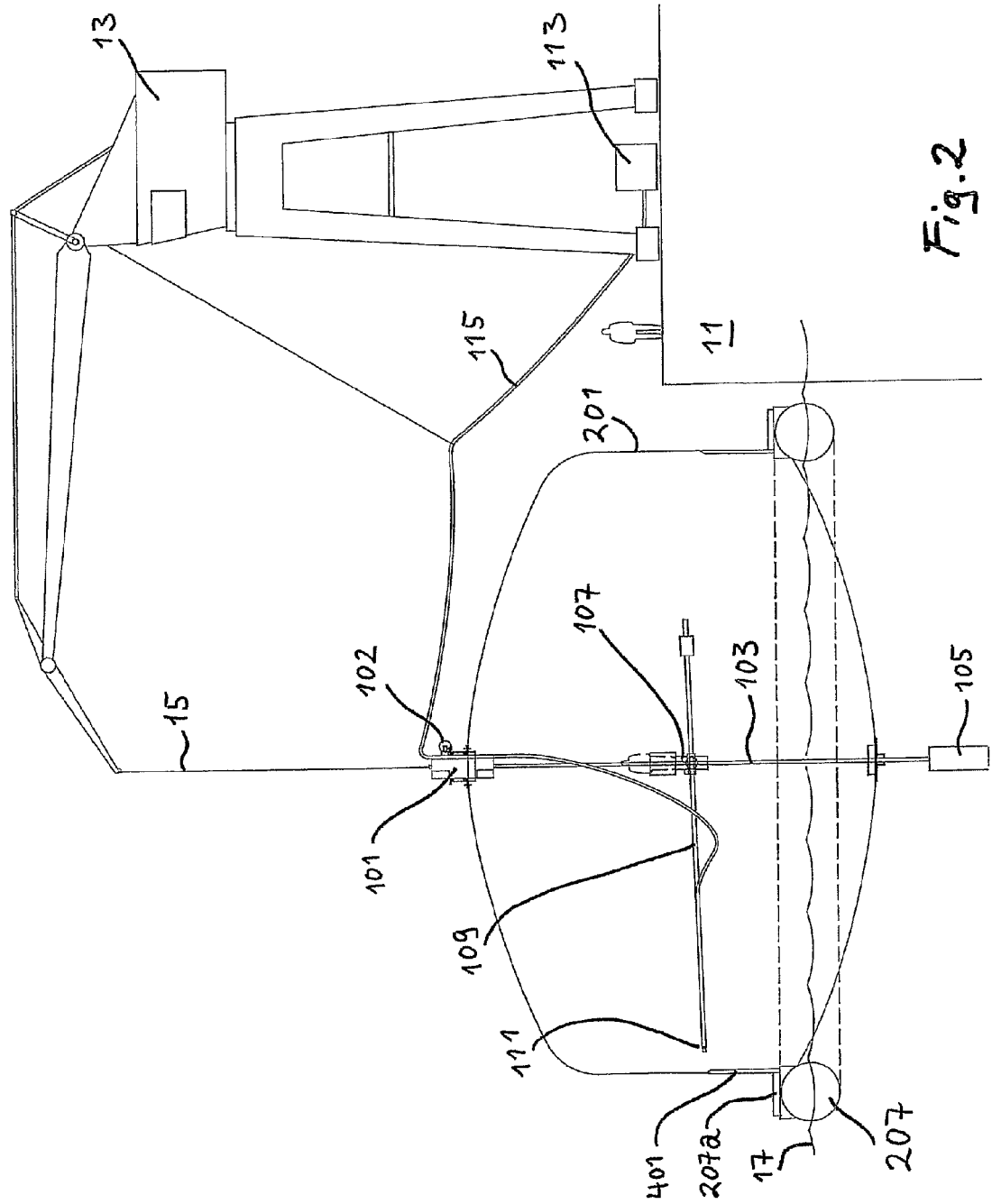
FIG. 2 is a side view showing some alternatives to the embodiment shown in FIG. 1.

In FIG. 2 is shown an embodiment of the present invention which by many features corresponds with the one described with reference to FIG. 1. In this embodiment, however, the form 201 has a substantially less vertical extension, and has a width which is longer than its height.

Furthermore, in this particular embodiment, the form is arranged with a floater element 207. The floater element 207 is attached to a lower part of the form 201, along its outer periphery. The floater element can be a (easily turnable) circular raft with a flat upper floor 207a, against which the balloon form 201 can be fastened and fitted with forms for flanges. Or it can be a raft formed from 'doughtnu' ring with similar function formed by a tube, e.g. from plastic.

As in the embodiment described with reference to FIG. 1, there is arranged an inner spraying arrangement 107 inside the form 201. Furthermore, there can be arranged an outer spraying arrangement 301 (see FIG. 6) outside the form 201, for spraying material onto the outer surface of the form 201. As described above, the form 201 can rotate about its rotation axis. Thus, when spraying on its outer surface, the outer spraying arrangement 301 does not have to move about the circumference of the form 201.

In FIG. 2 one can see a first part of an inner material layer 401 which has been sprayed onto the lower inner surface of the form 201.

Referring now to FIG. 3, a further possible embodiment according to the present invention is described. As with the previously described embodiment, this embodiment also corresponds, with regard to many features, to the one described with reference to FIG. 1. However, in this embodiment the crane 13 shown in FIG. 1 and FIG. 2 is replaced with a less complex lifting device 13'. The lifting device 13' comprises a beam 13a' hingedly attached to the quay 11. Two wires 13b' are also attached to the quay 11, with a distance from the beam 13a'. The wires 13b' extend up to and is attached to the top of the upwardly and inclined extending beam 13a', keeping the top of the beam 13a' arranged above the water surface 17 adjacent to the quay 11.

Alternatively, instead of having one beam 13' and two wires 13b', one could also use two beams and one wire.

Between the top of the beam 13a' and the form handling arrangement 101, there is attached a suspension element 15' having a spring function. Thus the extension of the suspension element 15' corresponds to the gradually increasing pulling weight from the form 201 or the form handling arrangement 101 to which it is attached, thereby lessening the increase of stress on the crane.

As appears from FIG. 3, the form in this embodiment has a different shape than the ones in the previously described embodiments.

FIG. 4 and FIG. 5 show in side- and front views yet another embodiment according to the present invention. In this embodiment the form 201 is not suspended from above in any way. Instead it is floated on the water adjacent to the quay 11. As with the embodiments described above, it has an inner spraying arrangement 107" arranged inside. Also, a tube 103" extends through the form 201, aligned with the rotation axis. The tube 103" and the rotation axis is however horizontally arranged, parallel to the water surface 17.

The tube 103" is connected to a pivot arm 13" that extends out from the quay 11. Along with the pivot arm 13" is also attached a supply line (not shown in FIG. 4) for providing a setting construction material to the inner spraying arrangement 107". The material is provided from the mixer/pump unit 113 arranged on the quay 11. As with the above described embodiments, the inner spraying arrangement 107" can move about inside the form, along the tube 103".

Also connected to the tube 103", and moving along it together with the inner spraying arrangement 107", is one or more support arrangement(s) 117. The support arrangement 117 comprises a downwardly extending bar onto which a set of support wheels 119 are attached. The support wheels 119 roll against the inner surface of the form 201, thereby supporting the tube 103" and ensuring correct vertical distance between the tube 103" and the inner surface of the form 201.

Figure 6:
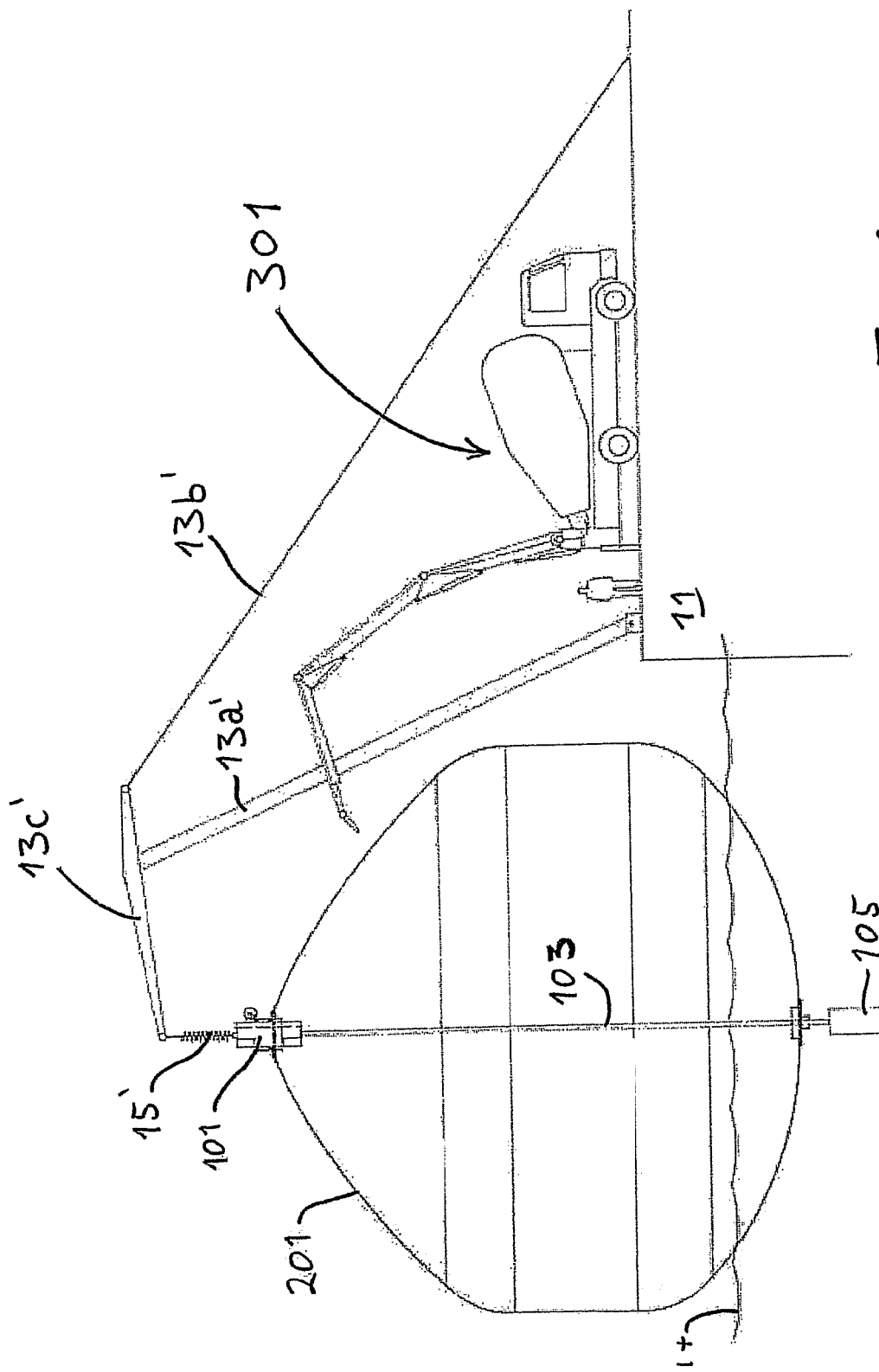
FIG. 6 is a setup similar to the embodiment shown in FIG. 3, with a concrete lorry parked on the quay.

In FIG. 6 is shown an embodiment which to a large extent corresponds to the embodiment described with reference to FIG. 3. However, in FIG. 6 an outer spraying arrangement 301 is shown in the form of a concrete lorry. It is provided with a nozzle arranged at the end of an arm extending from the truck. In addition, the lifting device is adapted with an additional beam 13c' at the upper part, which by manipulation with the wire 13b' can be used to lower and raise the form 201.

FIG. 7 shows a more detailed cross section view of the lock chamber arrangement 104 in connection with the form handling arrangement 101. The lock chamber arrangement 104 provides access for a person without loosing the inner pressure of the form 201, when the form 201 is inflated. The lock chamber 104 has a tubular shape, and has a first and second sealed door 106 for personnel entering or leaving the inner volume of the form 201. The form 201 is attached to the lock chamber arrangement 104 (or the form handling arrangement 101, respectively) through a bearing which makes rotation of the form 201 about the lock chamber arrangement 104 possible. The gear motor 102 is arranged to rotate the form 201, as it can engage toothed wheel operatively connected to the form/bearing.

A particular advantage of letting the form hang freely in the air or being partially floated on a body of water, is that various shapes of forms, or more particularly the shapes of the lower part of the forms, can be made without having to adjust additional equipment. In contrast, when constructing a construction with a non-flat or a particular lower shape by using prior art solutions with stiff moulds, one must make at least one mould for each desired shape. With the present invention, each form can be tailor made in the sheet material. This results in a more flexible and cheaper solution if producing only small amounts of constructions. In addition, one will avoid the work of assembling and removing a stiff form or the formwork.

Although the above described embodiments show solutions where the form is floated on water adjacent a quay, it should be clear to a person skilled in the art that such floatation also could be without any adjacent quay. For instance, the spraying of the form with a setting construction material can take place in open sea or on a smaller body of water onshore, such as in an artificially created pool or a lake, as mentioned above.

In a second aspect of the invention, there is provided a method for construction of large scale shell construction wherein a setting construction material is sprayed onto an inflated form, characterized in floating the form on a body of water, and preferably letting the form alter its orientation during the spraying process. The form can for instance be moved in a reciprocating movement while simultaneously being slowly rotated.

The invention claimed is:

1. A method of manufacturing a large-scale shell construction, the method comprising:
spraying a form with a setting construction material;
rotating the form about a rotation axis while applying said setting construction material; and
floating the form in water.

2. The method according to claim 1, comprising suspending the form from above in a point through which the rotation axis runs.

3. The method according to claim 1, wherein the form encloses an inner volume.

4. The method according to claim 1, wherein a lower part of the form is of a non-planar shape.

5. The method according to claim 1, comprising spraying an inner surface of the form by supplying construction material from the outside of the form, through a construction material supply line extending into the form, and by means of an inner construction material spraying arrangement situated inside the form.

6. The method according to claim 1, comprising coating an outer surface of said form using an outer construction material spraying arrangement, which arrangement is maintained in a constant position with respect to the position of the form, wherein the said spraying arrangement is adapted to move a spraying nozzle along a plane substantially parallel to the rotation axis.

7. The method according to claim 1, comprising suspending the form in a crane hook arrangement arranged on a dock or a quay, above, and extending into, a body of water.

8. The method according to claim 1, comprising:
suspending the form in a manner enabling a vertical rotation axis; and
arranging a weight to the lower side of the form to provide stability.

9. The method according to claim 1, comprising:
floating the form on water;
rotating the form about a horizontal rotation axis; and
wherein an inner spraying arrangement is used for spraying the inner surface of said form.

10. A method of manufacturing a large-scale shell construction, the method comprising:
arranging a form on a floater element that floats in water;
applying the form with a setting construction material; and
rotating the form about a rotation axis while applying said setting construction material.

11. The method of claim 10, wherein:
the floater element is formed by a tube; and
the floater element is toroid shaped.

12. The method of claim 10, wherein the floater element is attached to a lower part of the form.

13. A method of manufacturing a large-scale shell construction, the method comprising:
applying a form with a setting construction material;
rotating the form about a rotation axis while applying said setting construction material; and
suspending the form in a crane hook arrangement, the crane hook arrangement being disposed on at least one of a dock, a quay, a ship, or a floating structure above, and extending the form into, a body of water.

* * * * *

UNITED STATES PATENT AND TRADEMARK OFFICE
CERTIFICATE OF CORRECTION

PATENT NO. : 8,663,534 B2 Page 1 of 1
APPLICATION NO. : 13/389834
DATED : March 4, 2014
INVENTOR(S) : Jan Capjon It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 65 days.

Signed and Sealed this
Twenty-ninth Day of September, 2015

Michelle K. Lee
*Director of the United States Patent and Trademark Office*